(12) United States Patent
Abdalla et al.

(10) Patent No.: US 6,535,209 B1
(45) Date of Patent: Mar. 18, 2003

(54) DATA STREAM SPLITTING AND STORAGE IN GRAPHICS DATA PROCESSING

(75) Inventors: Karim Abdalla, Menlo Park, CA (US); Oren Rubinstein, Sunnyvale, CA (US); Ming Benjamin Zhu, San Jose, CA (US)

(73) Assignee: Nvidia US Investments Co., Santa Clara, CA (US)

( * ) Notice: Subject to any disclaimer, the term of this patent is extended or adjusted under 35 U.S.C. 154(b) by 0 days.

(21) Appl. No.: 09/713,447

(22) Filed: Nov. 14, 2000

Related U.S. Application Data

(63) Continuation-in-part of application No. 09/271,636, filed on Mar. 17, 1999.

(51) Int. Cl.[7] .............................................. G06T 17/00
(52) U.S. Cl. ...................................... 345/418; 345/419
(58) Field of Search ................................ 345/418, 419, 345/530

(56) References Cited

U.S. PATENT DOCUMENTS 5,953,506 A * 9/1999 Kalra et al. ................. 345/428

\* cited by examiner

*Primary Examiner*—Cliff N. Vo
(74) *Attorney, Agent, or Firm*—Townsend and Townsend and Crew LLP

(57) ABSTRACT

A computer graphics system splits vertex data into first and second streams and stores the streams in separate regions of memory. In a specific embodiment, the first stream includes positional data and the second stream includes non-positional color and texture data. A visibility subsystem uses only the first stream to perform visibility processing, thus reducing bandwidth requirement. The rendering system processes data from subsets, identified by the visibility subsystem, of both streams required to render the visible part of a scene.

16 Claims, 3 Drawing Sheets

DATA STREAM SPLITTING AND STORAGE IN GRAPHICS DATA PROCESSING

CROSS REFERENCE TO RELATED APPLICATIONS

This application is a continuation-in-part of commonly-assigned U.S. patent application Ser. No. 09/271,636, filed Mar. 17, 1999, entitled "Optimized System and Method for Binning of Graphics Data," by Zhu et al, and is hereby incorporated by reference in its entirety.

BACKGROUND OF THE INVENTION

In the field of computer graphics, complex images are generated from simple geometries such as triangles and polygons. A typical 3-D computer generated image may consist of millions of triangles. Each of these triangles and mode information about the triangles must be stored in memory and processed rapidly. Accordingly, developing techniques for efficiently storing graphics data in memory and for rapidly accessing data from memory are critical to improving the performance of computer graphics systems.

One technique for improving access to memory is binning, which is described in the co-pending, commonly assigned patent application referenced above. Briefly, a binning system divides a display into tiles of predefined pixel dimensions. Geometry data for all polygons that "touch" a tile are stored in an associated area of memory termed a "bin." Each bin is a designated area of the graphics memory which is dynamically allocated for each frame and is accessed by a specially configured memory controller.

From any given viewpoint, not all pixels belonging to triangles will be visible. For example, if the object were a building, and a car was parked behind the building, then the car would not be visible. Thus, 3-D rendering pipelines include a visibility subsystem for determining which pixels are visible. Also, visibility subsystems use an algorithm, such as Z-buffering, to determine which pixels are in front of other pixels. Only the frontmost pixels need be rendered. Additionally, a triangle that contains no visible pixels need not be processed by the rendering engine.

Vertex data includes geometry, color, and possible other data associated with a vertex. The visibility subsystem must rapidly process all geometry information to detect visibility information. Thus, the visibility system requires large memory bandwidth.

Accordingly, techniques for reducing the memory bandwidth requirements for performing visibility processing are vital to increasing the speed of a computer graphics system.

SUMMARY OF THE INVENTION

According to one aspect of the invention, a stream of scene data is stored in separate spaces in memory as two separate streams, a Z stream including positional vertex data such as x,y,z coordinate data required to determine whether a geometry is visible, and a C stream including all other vertex data, such as color and texture parameters, required to render a geometry.

According to one aspect of the invention, a stream of scene data is split and stored in separate spaces in memory as two separate streams, a Z stream including positional vertex data such as x,y,z coordinate data required to determine whether a geometry is visible, and a C stream including all other vertex data, such as color and texture parameters, required to render a geometry.

According to another aspect of the invention, all mode data affecting visibility and rendering is store only in the Z stream and is not duplicated in the C stream.

According to another aspect of the invention, only the Z stream is provided to the visibility subsystem to reduce memory bandwidth requirements and improve visibility preprocessing efficiency.

According to another aspect the invention, both Z and C streams are provided to the rendering engine to render geometries determined to be visible by the visibility subsystem.

According to another aspect the invention, only segments representing visible geometries of both Z and C streams are provided to the rendering engine to render geometries determined to be visible by the visibility subsystem.

According to another aspect of the invention, the visibility system provides visible geometries directly to the rendering engine.

Other features and advantages of the invention will now be apparent in view of the following detailed description and appended drawings.

DETAILED DESCRIPTION OF THE PREFERRED EMBODIMENTS

The invention will now be described, by way of example, not limitation, in an embodiment that utilizes binning. The techniques described below provide the same advantages to a system that does not use binning, for example a system that utilizes a memory to store geometries for an entire frame.

Figure 1:
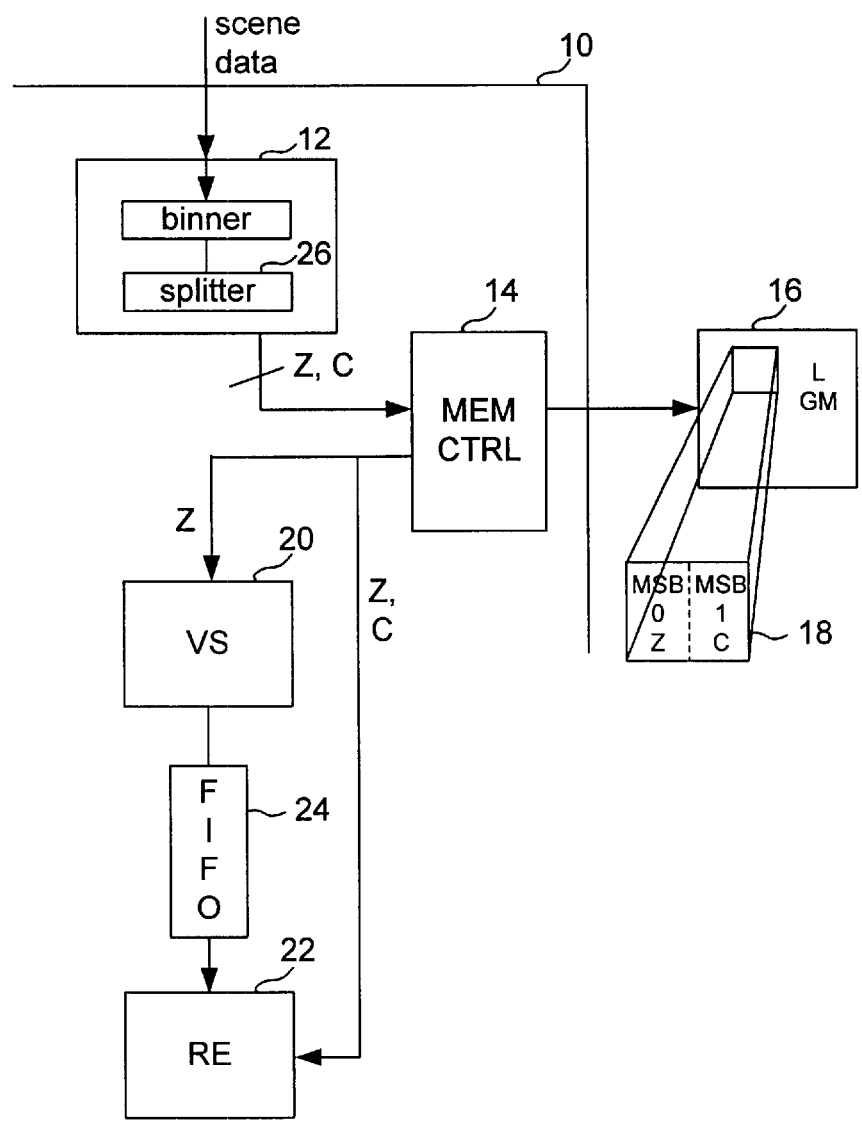
FIG. 1 is a block diagram of a system for implementing an embodiment of the invention.

An implementation of a preferred embodiment of the invention in a graphics chip system now be described with reference to FIG. 1. In FIG. 1, scene image data is supplied to a graphics system 10. The graphics system 10 can be implemented in any suitable hardware, software, or a combination in both. In one embodiment, graphics system 10 is implemented in one or more semiconductor devices such as an application specific semiconductor device (ASIC) and supporting memory devices.

In FIG. 1, vertex data is received by a binning engine 12. The binning engine outputs two streams (Z and C) of vertex data to a memory controller 14. The memory controller 14 is coupled to local graphics memory 16 and stores the streams in separate spaces of the local graphics memory 16, a part of which is configured into bins 18 for storing vertex data for a particular tile. The memory controller 14 is also coupled to a visibility subsystem 20 and a rendering engine 22. The visibility subsystem is connected to the rendering engine by an optional FIFO 24. The function of the optional FIFO 24 is described below.

Figure 2:
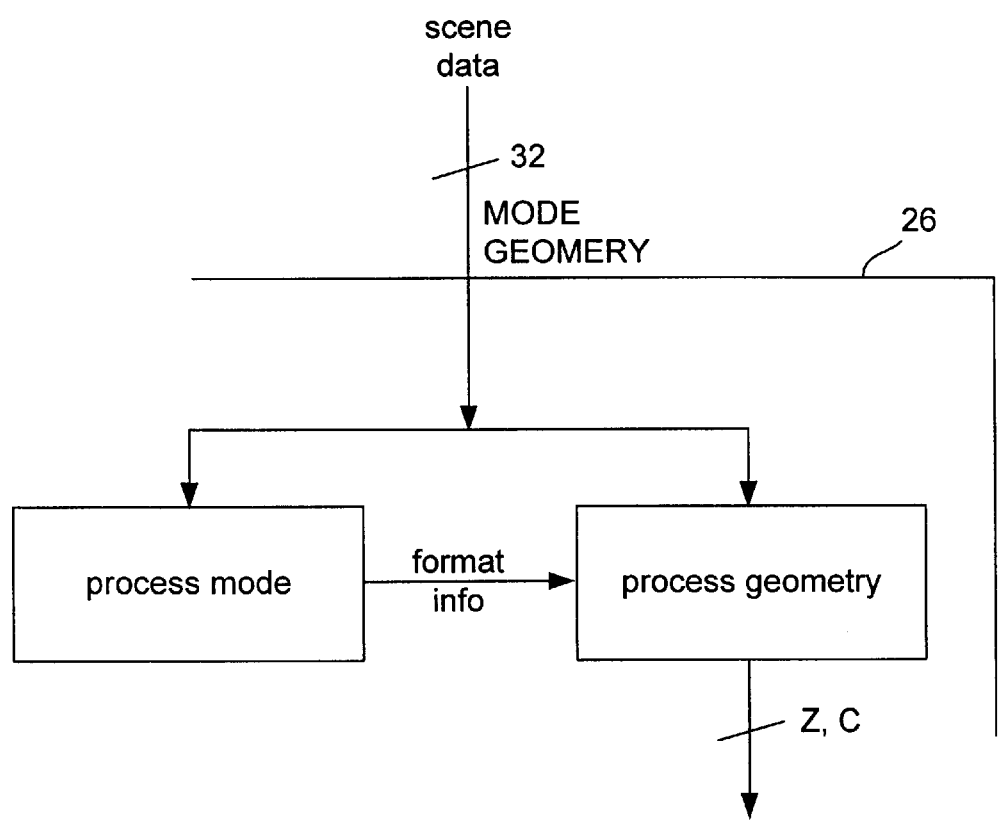
FIG. 2 is a block diagram of a stream splitting module.

FIG. 2 is a block diagram of the stream splitting subsystem. In a binning system the stream splitting can be implemented in the binning engine by a stream splitting component 26. In a non-binning system the stream splitting system 26 can be implemented as a separate hardware of software module or integrated with other components in the rendering pipeline.

Typically, a stream of data describing a scene is received by the rendering pipeline. This received stream includes two categories of data: mode, or control, data and geometry data.

In the presently described embodiment the received data is in the form of packets received on a 32-bit bus and one packet may be received on this bus over several clocks.

Each packet includes a header and a payload. The mode data may have many different functions, one of which is to define the format of geometry packets in a system that supports variable formats. Other functions of the mode packets is to set a machine state that may affect visibility processing or to set a machine state that affects rendering. The header of the mode packet may include an address of some subset of the machine state to be set. A geometry packet payload includes, among other things, vertex positional data identifying the x,y,z coordinates of a vertex and color data for the vertex.

The splitter sub-system utilizes mode packets addressing it to determine the format of the received geometry packets and generates control information based on the payload of the mode packet to identify which bits in the payload of a geometry packet contains x,y,z coordinates of a vertex and which bits specify color information of a vertex.

The stream splitting modules reformats the geometry packets into new packets of two types: Z stream packets include vertex x,y,z coordinate data, modes that affect visibility and rendering, and control data; and C stream packets include vertex color data and other non-positional vertex data. For example, if the Z stream were compressed the optional control data could be used to uncompress the coordinate data. Headers are added to the data to identify which packets are in the Z stream and which are in the C stream. The C stream has a much simpler general structure that the Z stream and is composed of vertices that map one-to-one with vertices in the Z stream.

Figure 3:
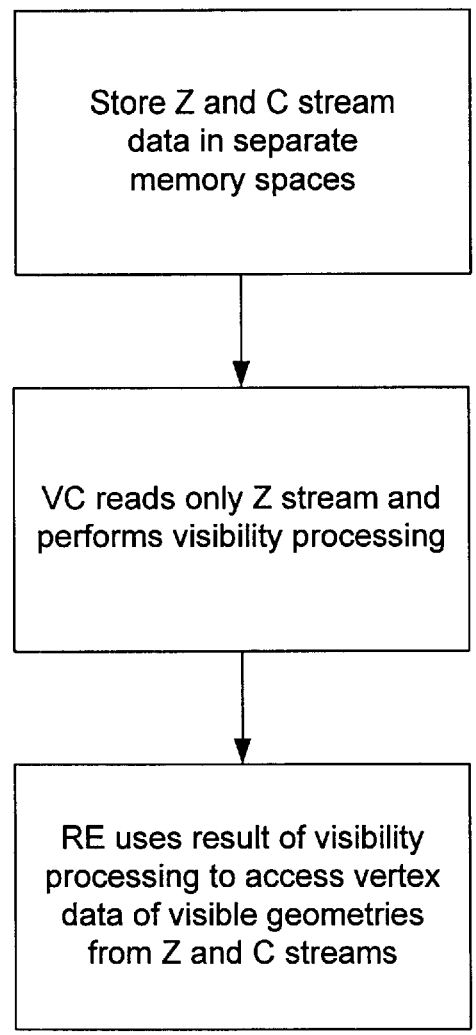
FIG. 3 is a flowchart depicting a sequence of acts implemented by an embodiment of the invention.

FIG. 3 is a flowchart depicting steps implemented by the presently described embodiment render a scene. If the vertex data is received as a single stream of data, a stream splitting sub-system divides the data into Z and C streams, with the Z stream including the x,y,z data for each vertex as well as modes that affect visibility processing and rendering and the C (color) stream including non-positional parameters for each vertex. Alternatively, the stream may be split, for example by software, prior to being received by the rendering pipeline. An important advantage of this embodiment is that modes only go to the Z-stream and do not have to be duplicated into both the Z and C streams.

In the presently described embodiment, each tile is allocated a memory bin having a virtual address space of 4 Gbytes (32 address bits). The topmost address bit of a 32-bit address space is used to distinguish the virtual address space for the Z stream (MA[31]=0) and C stream (MA[31]=1). Note that the bins for each tile are not of a fixed size but are allocated dynamically by the memory controller.

The memory controller maintains a current virtual address for each of the two separate virtual address spaces. An incoming packet is analyzed to determine its type (Z or C) and assigned the current address to the correct virtual address space. The current address is the incremented.

In a non-tiling system the memory corresponds to the entire display, and two virtual address spaces are created for the Z and C streams. A "tile" can be considered to cover the entire screen and the binary memory can be considered as pair of buffers, one for the Z stream and one for the C stream.

As is well known in the art, visibility preprocessing is performed before rendering so that the rendering engine need only access vertex data from memory for geometries that are visible. In the presently described embodiment, the visibility subsystem determines visibility and thus reads vertex data at a high rate from the local graphics memory creating a need for high memory bandwidth. Because the visibility subsystem acts as a screen-coverage-based filter for what triangles the rendering engine needs to render fragments of, the visibility system has a much higher vertex processing rate than the rendering engine.

In a tiling system the visibility system reads only the Z stream from the memory bin 18 for the current tile to be rendered. In a non-tiling system the visibility system reads only the Z stream for the entire screen. As described above, the Z stream includes the x,y,z data (and mode data including modes that affects visibility) for each vertex which is the only part of the vertex data required to determine the visibility of geometry. Thus, memory bandwidth requirements are reduced because only a part of the vertex data is provided to the visibility subsystem 20. Additionally, the processing speed of the visibility subsystem is increased because there is no need to discriminate between different or optional parameters, such as color, for each vertex.

In the presently described embodiment, the visibility subsystem provides pointers to the rendering engine which are used to access vertex data for geometries determined to be visible and provides mode data that affects rendering. Alternatively, the visibility subsystem can send x,y,z data of visible geometries and mode data that affects rendering directly to the rendering engine. The output of the visibility subsystem tends to be "bursty" because visibility results may not be output until visibility processing is completed. The optional FIFO provides visibility data to the rendering engine at a constant rate so that the rendering engine is not stalled waiting on data.

Both the Z and C streams, or visible segments thereof representing visible geometries and mode data that affects rendering, are provided to the rendering engine. This is because the complete set of vertex data, including diffuse and specular color components as well as texture data needed to determine the final color contribution of pixels within a triangle, are required to render the scene from the particular viewpoint.

The invention has now been described with reference to the preferred embodiments. Alternatives and substitutions will now be apparent to persons of skill in the art. In particular, different memory management systems may be used to separate and access the data of the two streams. The invention is equally useful in graphics system that utilize binning and in systems that do not utilize binning. Further, the Z and C streams have been shown stored in a local graphics memory, however, storage in other memory, such as system memory is optional. Accordingly, it is not intended to limit the invention except as provided by the appended claims.

What is claimed is:

1. A method for processing vertex data performed by a computer graphics system that renders scenes and stores vertex data in memory, said method comprising:

storing a stream of vertex data in first and second memory spaces in the graphics memory, with the first memory space storing a first portion of said vertex data including positional vertex data and the second memory space storing a second portion of said vertex data including color vertex data;

reading said first portion of said vertex data from the first memory space;

performing visibility processing utilizing only said first portion of said vertex data read from the first memory space to determine which areas of the scene are visible; and accessing, based on results of visibility processing, only a subset of vertex data of said first and second portions of said vertex data required to render visible areas of a scene.

2. The method of claim 1 wherein said step of performing visibility processing further comprises:
  forming a subset of said first portion of said vertex data required to render visible areas of the scene;
  and wherein said accessing further comprises:
  accessing the subset of said first portion of vertex data read from the first memory space for visibility processing.

3. The method of claim 1 wherein said step of accessing further comprises:
  reading said subset of the first and second portions of said vertex data from said first and second memory spaces.

4. A method for processing vertex data performed by a computer graphics system that renders scenes and stores vertex data in memory, said method comprising:
  receiving a stream of scene data including geometry data and control data;
  based on information in the control data, splitting the geometry data into first portion including vertex positional data and a second portion including vertex color data;
  storing the first portion of the geometry data in a first space in memory and storing the second portion in a second space in memory;
  reading only said first portion of said geometry data from the first space in memory;
  performing visibility processing utilizing only said first portion of said geometry data read from the first space in memory to determine which areas of the scene are visible; and
  accessing, based on results of visibility processing, only a subset of geometry data of said first and second portions of said geometry data required to render visible areas of a scene.

5. The method of claim 4 wherein said step of performing visibility processing further comprises:
  forming a subset of said first portion of said geometry data required to render visible areas of the scene;
  and where said step of accessing further comprises:
  accessing the subset of said first portion of geometry data memory read from the first space in memory for visibility processing.

6. The method of claim 4 wherein said step of accessing further comprises:
  reading said subset of the first and second portions of said geometry data from said first and second memory spaces.

7. A method for processing vertex data performed by a computer graphics system that renders a scene, partitions a display into tiles, and stores vertex data for each tile in a corresponding memory bin, said method comprising:
  storing a set of vertex data in first and second memory spaces in each memory bin, with the first memory space storing a first portion of said vertex data including positional vertex data and the second memory space storing a second portion of said vertex data including color vertex data;
  reading only said first portion of said vertex data from the first space of a memory bin;
  performing visibility processing utilizing said first portion of said vertex data to determine which geometries are visible in the corresponding tile; and
  accessing, based on results of said visibility processing, a subset of vertex data from said first and second portions of said vertex data from each bin required to render visible parts of the scene.

8. A computer graphics system that partitions a display into tiles comprising:
  a binning engine for receiving vertex data and providing first and second streams of vertex data, with the first stream including positional vertex data including x,y,z coordinate data and the second stream including non-positional data including color data;
  a memory;
  a memory controller, coupled to the binning engine and local graphics memory, for storing vertex data in memory bins corresponding to tiles, wherein, for each memory bin, the first stream is stored in a first space addressed by a first set of addresses and the second stream is stored in a second space addressed by a second set of addresses;
  a visibility subsystem, coupled to the memory by said memory controller, for reading only the first stream from a memory bin and performing visibility processing to determine the identity of geometries that will be visible in a corresponding tile; and
  a rendering engine coupled to the visibility subsystem and to the memory by the memory controller, the rendering engine utilizing the results of visibility processing to read only vertex data from the first and second spaces of the memory bin required to render the visible part of the scene.

9. A computer graphics system that partitions a display into tiles comprising:
  a binning engine for receiving vertex data and providing first and second streams of vertex data, with a first stream including positional vertex data including x,y,z coordinate data and the second stream including non-positional data including color data;
  a memory;
  a memory controller, coupled to the binning engine and local graphics memory, for storing vertex data in memory bins corresponding to tiles, wherein, for each memory bin, the first stream is stored in a first space addressed by a first set of addresses and the second stream is stored in a second space addressed by a second set of addresses;
  a visibility subsystem, coupled to the memory by said memory controller, for reading only the first stream from a memory bin, performing visibility processing to determine the identity of geometries that will be visible in a corresponding tile, and for forming a subset of said first stream required to render visible areas of a scene; and
  a rendering engine coupled to the visibility subsystem and to the memory by the memory controller, coupled to receive the subset of said first stream from the visibility subsystem, the rendering engine utilizing the results of visibility processing to read only a subset of the second stream from the second space of the memory bin required to render the visible part of the scene.

10. A computer graphics system comprising:
  a stream splitting module for receiving vertex data and providing first and second streams of vertex data, the first stream including positional vertex data including x,y,z coordinate data and the second stream including non-positional data including color data;

a memory;

a memory controller, coupled to the stream splitting module and memory, for storing vertex data in memory, with the first stream stored in a first space addressed by a first set of addresses and with the second stream stored in a second space addressed by a second set of addresses;

a visibility subsystem, coupled to the memory by said memory controller, for reading only the first stream from a memory bin and performing visibility processing; and a rendering engine coupled to the visibility subsystem and to the memory by the memory controller, the rendering engine utilizing the results of visibility processing to read a subset of vertex data from the first and second spaces of the memory required to render the visible part of the scene.

11. A computer graphics system comprising:

a stream splitting module for receiving vertex data and providing first and second streams of vertex data, the first stream including positional vertex data including x,y,z coordinate data and the second stream including non-positional data including color data;

a memory;

a memory controller, coupled to the stream splitting module and memory, for storing vertex data in memory, with the first stream stored in a first space addressed by a first set of addresses and with the second stream stored in a second space addressed by a second set of addresses;

a visibility subsystem, coupled to the memory by said memory controller, for reading only the first stream, performing visibility processing to identify vertex data required to render visible areas of a scene, and for forming a subset of said first stream required to render visible areas of a scene; and a rendering engine coupled to the visibility subsystem and to the memory by the memory controller, coupled to receive the subset of said first stream from the visibility subsystem, the rendering engine utilizing the results of visibility processing to read only a subset of the second stream from the second space of the memory bin required to render the visible part of the scene.

12. A method for processing vertex data performed by a computer graphics system that renders scenes and stores vertex data in memory, said method comprising the acts of:

receiving a stream of scene data including geometry data and mode data;

based on information in the mode data, splitting the geometry data into first portion including vertex positional data and mode data that affects visibility processing or rendering and a second portion including vertex color data and no mode data;

storing the first portion of the geometry data in a first space in memory and storing the second portion in a second space in memory;

reading only said first portion of said geometry data from the first space in memory;

performing visibility processing utilizing only said first portion of said geometry data read from the first space to determine which areas of the scene are visible; and accessing, based on results of visibility processing, only a subset of geometry data from said first and second portions of said geometry data required to render visible areas of a scene.

13. In a computer graphics system, a subsystem for processing scene data, the subsystem comprising:

a memory including a first memory space and a second memory space;

a memory controller coupled to receive a first stream of scene data including vertex positional data and a second stream of scene data including vertex color data and configured to store the first stream in the first memory space and the second stream in the second memory space; and a visibility processing engine coupled to the memory and configured to perform visibility processing to identify a subset of the first stream required to render visible areas of a scene, wherein the visibility processing engine accesses the first memory space and not the second memory space.

14. The subsystem of claim 13, further comprising:

a rendering engine configured to receive from the memory a subset of the first stream required to render visible areas of a scene as identified by the visibility processing engine and a corresponding subset of the second stream and to render the scene using the received subsets of the first and second streams.

15. The subsystem of claim 14, further comprising:

a first-in, first-out buffer coupled between the rendering engine and the visibility processing engine and configured to store visibility data produced by the visibility processing engine and to provide stored visibility data to the rendering engine.

16. The subsystem of claim 13, further comprising:

a stream splitting module configured to receive scene data, to form the first stream and the second stream from the received scene data, and to provide the first stream and the second stream to the memory controller.

* * * * *